Dec. 26, 1950     M. C. SIMON     2,535,654
CONCEALED CASTER UNIT FOR FURNITURE
Filed Feb. 21, 1948
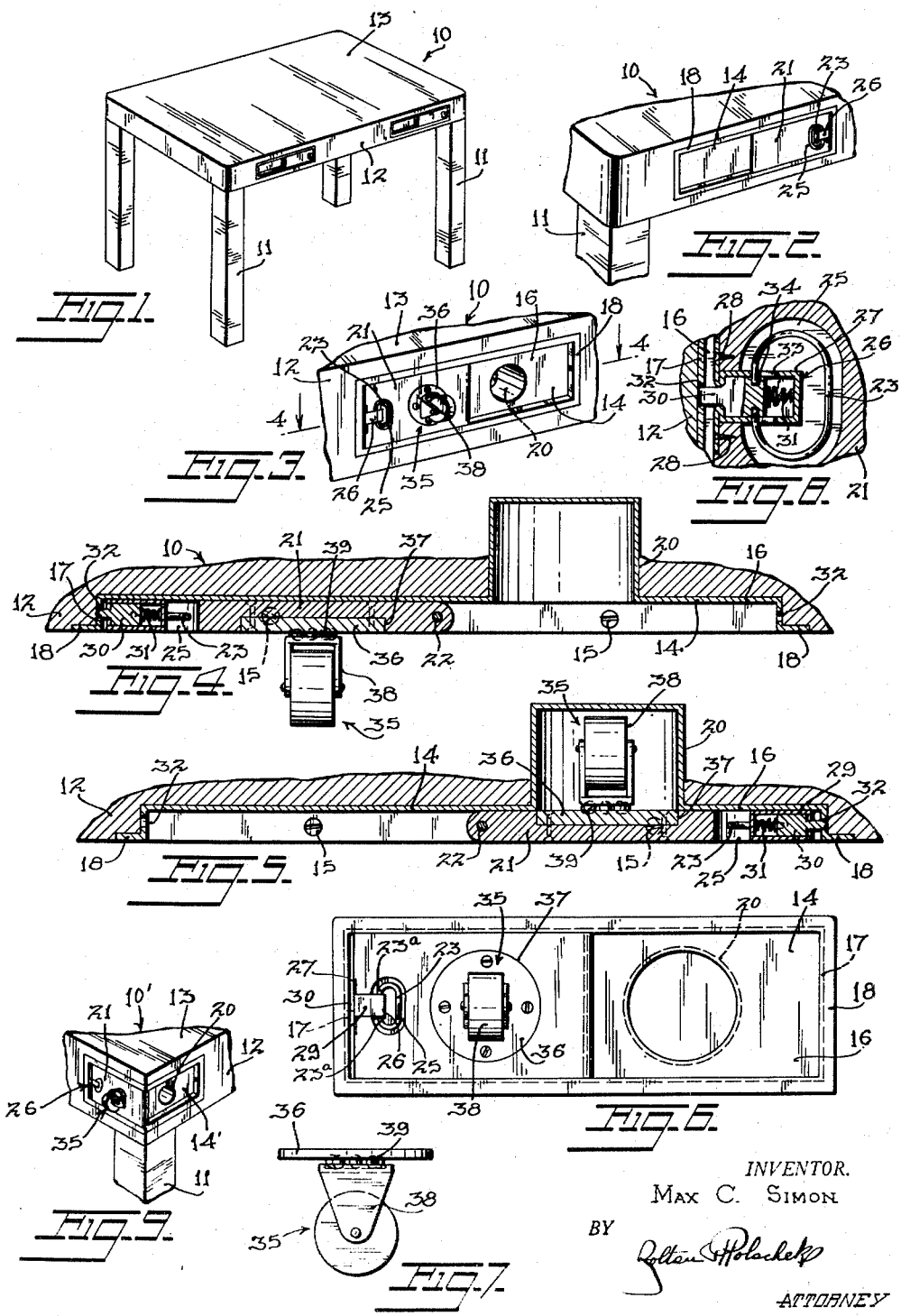
INVENTOR.
Max C. Simon
BY
*Bolton Holechek*
ATTORNEY Patented Dec. 26, 1950

2,535,654

UNITED STATES PATENT OFFICE 2,535,654

CONCEALED CASTER UNIT FOR FURNITURE

Max C. Simon, Jamaica, N. Y.

Application February 21, 1948, Serial No. 9,983

3 Claims. (Cl. 16—18)

1

This invention relates to an improvement in the disappearing caster or roller shown in my copending patent applications filed on June 25, 1946, Serial Number 679,301, now Patent Number 2,521,547, issued September 5, 1950, and on November 8, 1946, Serial Number 708,592, now Patent Number 2,529,789, issued November 14, 1950.

One of the objects of the present invention is to provide a finishing plate which can be attached to the side of the rollable table, with a plate pivotally mounted thereon and provided with a caster wheel mounted to freely turn with the plate.

Another object of the invention is the provision of a finishing plate with a plate pivoted at one end thereto and carrying a caster wheel which swings with the plate from a socket formed in the side of the table to a position external of the side of the table, to provide a support for rolling the table edgewise.

Another object of the invention is the provision of a handle which is pivoted to the finishing plate to fold therein, and which is provided with means for latching the swinging plate in either of its two positions.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a table showing the disappearing caster supporting plates, in their normally closed position to conceal the caster wheels.

Fig. 2 is an enlarged front perspective view showing one of the caster plates in closed position.

Fig. 3 is a similar view, showing the caster plate in open position to expose its caster wheel.

Fig. 4 is a longitudinal sectional view, taken on line 4—4 of Fig. 3, showing the caster wheel in its operative position, and enlarged.

Fig. 5 is a sectional view similar to Fig. 4 showing the caster wheel in its inoperative position.

Fig. 6 is an enlarged front view of the caster construction with the caster in operative position.

Fig. 7 is a detail side view of the caster wheel.

Fig. 8 is a longitudinal sectional view of the carrier plate latch.

Fig. 9 is a partial perspective view of a modified form of the invention, showing a right angular caster construction.

For further comprehension of the invention, and of the objects and advantages thereof, reference will be had to the following description and accompanying drawings, and to the appended claims in which the various novel features of the invention are more particularly set forth.

Referring to the drawings, which illustrate the practical embodiment of the invention, 10 designates a table, having supporting legs 11, which may be connected in any matter thereto.

The side 12 of the table top 13 is constructed with a pair of pockets or recesses in each of which a finishing and housing plate 14 is nested, being secured in place by screws 15, or otherwise.

The finishing or housing plate 14 is formed with a floor wall 16, marginal edge wall 17, and a trim flange 18, which seats against the outer face of the side 12. This plate thus forms a chamber 19 within the area bounded by the marginal edge wall 17.

The finishing and housing plate 14 is secured across a socket or opening 20 formed in the table side 12. A carrier plate 21 is pivoted in the chamber 19 by a pin 22, which extends through the carrier plate and through the edge wall 17 to permanently hold the plate 21 for pivotal movement in the chamber 19.

The length of the carrier plate 21 is approximately one half the length of the finishing and housing plate 14, and the pivot pin 22 is secured to one end of the carrier plate 21 and to the center of opposed marginal walls of the finishing plate 14, so that the carrier plate can swing into either half of the chamber 19.

The carrier plate 14 is provided with a handle 23, which is the form of a C-shaped wire frame having terminals 23ª, which form trunnions for pivotally supporting the handle within a complementary opening 25 in the carrier plate 21, so that the handle 23 is accessible from either side of the carrier plate 19.

The carrier plate 21 may also be provided with a latch 26, secured in the free end thereof, and which is adapted to have latching engagement with the opposite end walls 17 of the finishing and housing plate 14.

The latch 26 comprises a casing having a portion 27 substantially U-shaped set into a cutaway portion of the carrier plate 21 and having the free ends of its arms secured to the carrier plate by screws 28. The opposed sides of the U-shaped portion are closed by set in plates 29 which are welded, braised or in any other manner secured in position. A bolt 30 is slidably mounted in the casing and is urged by a spring 31 into an extended position in which the bolt is engageable with one or the other of keeper openings 32 formed in the end walls 17 of the finishing or housing plate 14 depending on the pivotal position of the plate 21. The ends of the C-shaped handle 23 are extended into the casing from opposite sides thereof through elongated slots 33 and engage into openings 34 in the bolt 30 to be used for withdrawing the bolt from the keeper opening 32 to release the carrier plate 19 to be pivoted about the pin 22.

Mounted on one face of the carrier plate 21 is a caster unit 35 which comprises a plate 36 secured in a recess 37 in the carrier plate 21. The usual caster wheel 38 is pivotally attached to the plate 36 in a manner to turn freely and ball bearings 39 are interposed between the plate 36 and the caster wheel 38 to facilitate rotation of the wheel. With the carrier plate 21 locked in the position shown in Fig. 4, the caster unit 35 is in its operative extended position permitting the table to which the device is attached to be rolled on the caster wheel 38. However, with the caster wheel in the position shown in Fig. 5 it is in its inoperative position and located within the socket 20 in the side of the article to which the device is attached.

In Fig. 9 a right angular finishing or housing plate 14' is shown mounted on the corner of the table 16' so that the carrier plate 21 may be positioned with the caster unit 35 in an operative extended position along one side of the table or be pivoted with the caster unit 35 in an inoperative position along the adjacent side of the table 16'. In other respects this form of the invention is the same as that previously described and similar reference designate like part throughout.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A caster unit, comprising an elongated housing open along one side, a pivot pin extended across said housing intermediate of its ends, a socket formed in said housing on one side of said pin and extended away from the open side thereof, a carrier plate of a length slightly less than half the interior length of said housing, said plate having one end pivotally mounted on said pin to be pivoted into said housing on either side of said pivot pin, a caster mounted on one side of said plate to project into said socket when said plate is pivoted into the socketed side of said housing and to extend from said housing when said plate is pivoted into the other side of said housing, and means for releasably retaining said plate in either of its two positions.

2. A caster unit, comprising an elongated housing open along one side, a pivot pin extended across said housing intermediate of its ends, a socket formed in said housing on one side of said pin and extended away from the open side thereof, a carrier plate of a length slightly less than half the interior length of said housing, said plate having one end pivotally mounted on said pin to be pivoted into said housing on either side of said pivot pin, a caster mounted on one side of said plate to project into said socket when said plate is pivoted into the socketed side of said housing and to extend from said housing when said plate is pivoted into the other side of said housing, and means for releasably retaining said plate in either of its two positions, said housing being elongated in a single plane.

3. A caster unit, comprising an elongated housing open along one side, a pivot pin extended across said housing intermediate of its ends, a socket formed in said housing on one side of said pin and extended away from the open side thereof, a carrier plate of a length slightly less than half the interior length of said housing, said plate having one end pivotally mounted on said pin to be pivoted into said housing on either side of said pivot pin, a caster mounted on one side of said plate to project into said socket when said plate is pivoted into the socketed side of said housing and to extend from said housing when said plate is pivoted into the other side of said housing, and means for releasably retaining said plate in either of its two positions, said housing having arms extended at 90° to each other with said pin located at the junction of said arms.

MAX C. SIMON.

REFERENCES CITED

The following references are of record in the file of this patent:

UNITED STATES PATENTS

| Number | Name | Date |
|---|---|---|
| 838,701 | Engstrom | Dec. 18, 1906 |
| 1,009,388 | Doll | Nov. 21, 1911 |
| 1,058,837 | Tikmund | Apr. 15, 1913 |
| 1,372,229 | Jelenc | Mar. 22, 1921 |
| 2,174,613 | Blaschke | Oct. 3, 1939 |